United States Patent [19]
Unternahrer et al.

[11] Patent Number: 5,980,101
[45] Date of Patent: Nov. 9, 1999

[54] METHOD AND APPARATUS FOR MEASURING LASER PULSE ENERGY

[75] Inventors: Josef Robert Unternahrer, Niskayuna; Phillip Randall Staver, Hagaman, both of N.Y.

[73] Assignee: General Electric Company, Schenectady, N.Y.

[21] Appl. No.: 08/961,692

[22] Filed: Oct. 31, 1997

[51] Int. Cl.$^6$ .................................................. G01K 17/00
[52] U.S. Cl. ........................................................ 374/32
[58] Field of Search ...................................... 374/32, 1, 2

[56] References Cited

U.S. PATENT DOCUMENTS

| | | | |
|---|---|---|---|
| 4,381,148 | 4/1983 | Ulrich et al. | 374/32 |
| 5,127,019 | 6/1992 | Epstein et al. | 372/108 |
| 5,157,676 | 10/1992 | Wilcox | 372/29 |
| 5,316,380 | 5/1994 | Secemski | 374/32 |
| 5,339,323 | 8/1994 | Hunter et al. | 372/25 |

OTHER PUBLICATIONS

Eustace L. Dereniak and Devon G. Crowe, *Optical Radiation Detectors*, 140–143, 148–149 (1984).
Warren J. Smith, *Modern Optical Engineering*, 360–363 (1990).

Primary Examiner—Diego Gutierrez
Assistant Examiner—Quyen Doan
Attorney, Agent, or Firm—Tyler Maddry; Marvin Snyder

[57] ABSTRACT

The invention relates to a method and apparatus for accurately measuring the energy of a laser pulse. The method according to one embodiment comprises directing a first laser pulse to an energy sensor which produces a first signal responsive to the first laser pulse, determining a time constant of the energy sensor based on the first signal, directing a second laser pulse to the energy sensor which produces a second signal responsive to the second laser pulse, and determining the pulse energy of the second laser pulse based on the second signal and the time constant. The method may be carried out with an apparatus which comprises an energy sensor which receives a laser beam and generates a signal responsive to the laser beam, a digitizer which digitizes the signal, and a computer which calculates a time constant of the energy detector based on the digitized signal of the first laser pulse incident on the energy detector and calculates an energy of a second laser pulse based on the digitized signal of the second laser pulse and the time constant. The method and apparatus provide accurate and timely energy measurements which can be used to improve the laser shock peening process.

17 Claims, 5 Drawing Sheets

METHOD AND APPARATUS FOR MEASURING LASER PULSE ENERGY

1. FIELD OF THE INVENTION

The present invention relates generally to energy measurement, and more particularly to a method and apparatus for accurately measuring the energy of a laser pulse.

2. DESCRIPTION OF THE RELATED ART

In many industrial applications using lasers, it is important to carefully control the parameters of the laser beam to achieve a desired physical effect. One example is laser shock peening, which is a process used to improve the surface characteristics of materials such as metals by the formation of a surface layer in the material which is in a state of compressive residual stress. In the laser shock peening process, a pulsed laser beam is typically focused through a transparent inertial confinement layer such as water, onto a part coated with an absorbing, ablative material such as paint, to generate a shock wave that plastically stretches the surface region of the part. The plastic deformation in the surface of the part produces a state of residual compressive stress in the part surface, which makes the part much more resistant to fatigue failure than an untreated part, because surface flaws are pressed together and their growth into cracks is inhibited. Laser shock peening is particularly useful, for example, in treating compressor fan blades in jet aircraft engines which comprise high temperature superalloys.

In laser shock peening, the mechanical stress generated by the laser pulse is typically very sensitive to the characteristics of the laser pulse. For example, the rise time of the laser pulse can have a significant effect on the resulting compressive stress which is generated in the part. Another important control parameter of the laser shock peening process is the fluence of the laser beam, defined as the energy per unit area measured at the part, which can significantly affect the resulting compressive stress generated in the part.

In order to control the fluence within specified tolerances, it is desirable to accurately measure the total energy of the pulse. However, in laser shock peening operations, pulse energies can be on the order of 50 Joules, which greatly restricts the number of devices available to measure such high pulse energies. A commercially available calorimeter manufactured by Scientech, Inc., model 380401, can be used to measure pulse energies on the order of 50 J. However, the time to obtain a measurement for a 50 J pulse is typically on the order of 3 minutes, which may constitute an unacceptably long delay in manufacturing operations, particularly if frequent energy measurements are desired. Also, the accuracy of the readout unit supplied with the calorimeter can be adversely affected to a significant extent by the electrical noise which commonly exists in the laser shock peening environment.

Other techniques for measuring pulse energy of a high energy pulse utilize an optical element to extract a fraction of the total energy to determine the total energy. Such techniques, however rely on questionable assumptions as to the value of the fraction of energy extracted, such as an estimated degree attenuation through a neutral density filter or an estimated reflectivity of a coated or uncoated surface, which results in inaccurate measurements.

It would be desirable, therefore, to have an apparatus and method capable of accurately and quickly measuring the pulse energy of a high energy laser pulse to monitor, control, and improve the laser shock peening process.

SUMMARY

The method according to one embodiment comprises directing a first laser pulse to an energy sensor which produces a first signal responsive to the first laser pulse, determining a time constant of the energy sensor based on the first signal, directing a second laser pulse to the energy sensor which produces a second signal responsive to the second laser pulse, and determining the pulse energy of the second laser pulse based on the second signal and the time constant.

The method may be carried out with an apparatus which comprises an energy sensor which receives a laser beam and generates a signal responsive to the laser beam, a digitizer which digitizes the signal, and a computer which calculates a time constant of the energy detector based on the digitized signal of the first laser pulse incident on the energy detector and which calculates an energy of a second laser pulse based on the digitized signal of the second laser pulse and the time constant.

The method and apparatus enable the laser shock peening process to be significantly improved by precise measurement of pulse energies and fine adjustment of the laser shock peening parameters which have a significant effect on the final product. The exemplary method and apparatus provide improved accuracy in laser shock peening without unduly delaying peening operations.

BRIEF DESCRIPTION OF THE DRAWINGS

Other features and advantages of the invention will be more readily understood upon reading the following detailed description in conjunction with the drawings, in which.

DETAILED DESCRIPTION OF THE PREFERRED EMBODIMENTS

Figure 1:
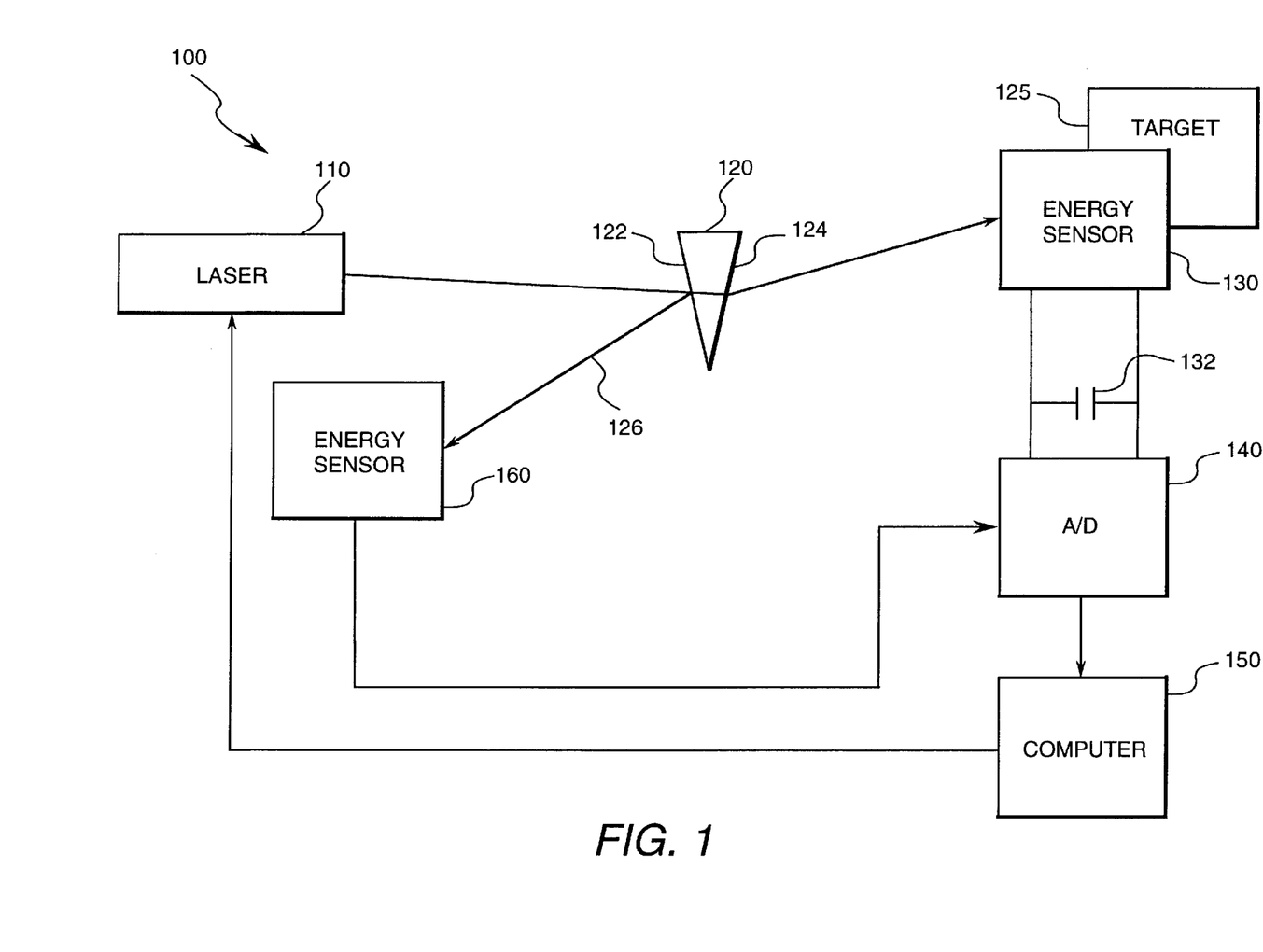
FIG. 1 is a diagram of an apparatus for measuring a pulse energy according to an exemplary embodiment of the invention.

FIG. 1 illustrates an apparatus for measuring a pulse energy according to an exemplary embodiment of the invention. As shown in FIG. 1, the apparatus 100 includes a laser 110, a partial reflector 120, a first energy sensor 130, a digitizer 140, a computer 150, and a second energy sensor 160. The laser 110 typically comprises a Nd:glass rod pumped with Xenon or Krypton flashlamps, a Q-switch such as a Pockels cell, and a laser cavity defined by a first nearly 100% reflective mirror and a second mirror of 70–80% reflectivity, for example. Such a laser can produce pulses having energies on the order of 50 J, which are suitable for laser shock peening.

The laser beam is incident upon the partial reflector 120 which redirects a portion of the energy to the second energy sensor 160. In the embodiment shown in FIG. 1, the partial reflector 120 is an optical wedge. The optical wedge 120 reflects a relatively constant and predictable portion of the incident energy, e.g. 4%, to the second energy sensor 160. The second energy sensor 160 may be a pyroelectric energy sensor, such as the J50 Pyro-electric Detector and EM500 joulemeter made by Molectron. The second energy sensor 160 can be connected to the digitizer 140 so that its output data can be read and analyzed by the computer 150.

The portion of energy transmitted through the partial reflector 120 is incident on the first energy sensor 130 during calibration of the apparatus 100. After calibration, the energy sensor 130 is removed, and the beam is incident on the laser shock peening target 125, which may be an airfoil comprising a superalloy, for example. Calibration involves the determination of an energy calibration factor (ECF) which represents the ratio of the energy received by the first energy sensor 130 or target 125 to the energy received by the second energy sensor 160. During laser shock peening, the energy calibration factor and the energy received by the second energy sensor 160 are used to determine the energy of pulses incident on the target 125. The energy information obtained from this measurement can then be fed back to the laser 110 for corrective actions if desired. For example, the energy information can be used by a human operator or electronically to adjust certain laser parameters such as pulse forming network (PFN) voltages to compensate for slow drifts in the energy output of the laser system.

The energy calibration factor can be determined by simultaneously measuring the energy incident on the first and second energy sensors 130, 160, and calculating the ratio of the energy measured by the first energy sensor 130 to the energy measured by the second energy sensor 160. Since the energy of the laser pulses during laser shock peening is obtained by multiplying a measured fraction of the actual energy by the energy calibration factor, both numbers should be determined carefully when determining the energy calibration factor. For improved accuracy, the energy calibration factor can be determined individually for a number of pulses and averaged. The energy calibration factor can also be determined by measuring the energies at the first and second energy sensors 130, 160 for a number of pulses, e.g. 20, averaging the measured values for each energy sensor, and calculating the ratio of the two averaged values.

The energy sensor 130, according to one embodiment, is a model 380401 calorimeter manufactured by Scientech, Inc. This calorimeter includes a glassy volume absorber of about 4 inch diameter which converts incident optical energy into heat energy, and a series of thermocouples forming a thermopile, which convert the heat energy into an output voltage signal V(t). The calorimeter also includes a factory installed readout unit which gives a value for the pulse energy. However, according to exemplary embodiments of the invention, only the output voltage signal V(t) is used.

The output voltage signal is sent to a digitizer 140, which digitizes and stores the output voltage signal upon receiving a trigger from a clock in the laser 110. According to one embodiment, the digitizer 140 comprises a digitizing oscilloscope, such as that manufactured by Tektronix, model 640TDS. A capacitor 132 may be connected across the input terminals of the digitizer 140 to suppress noise. The capacitor 132, which may have a capacitance of 3 $\mu$F for example, together with the output impedance of the calorimeter 130 (typically a few ohms), form a time constant long enough to significantly reduce the high-frequency noise in the voltage signal V(t), but still much shorter than the thermal time constant of the calorimeter 130, which may be tens of seconds, due primarily to the 4 inch diameter glassy volume absorber. Hence, the energy information contained in the voltage signal V(t) is not affected by this noise reduction method. Noise in the voltage signal V(t), according to another embodiment, can be filtered with the computer 150 by conventional numerical methods applied to the digitized data.

After a suitable time delay which allows the digitizer 140 to digitize and store the received voltage signal, the data is transmitted to the computer 150. The transmission can be made with conventional General Purpose Interface Bus (GPIB) hardware and software, for example. The computer 150 is suitably programmed to analyze the data and determine pulse energies in accordance with exemplary embodiments of the method which will now be described.

Figure 2:
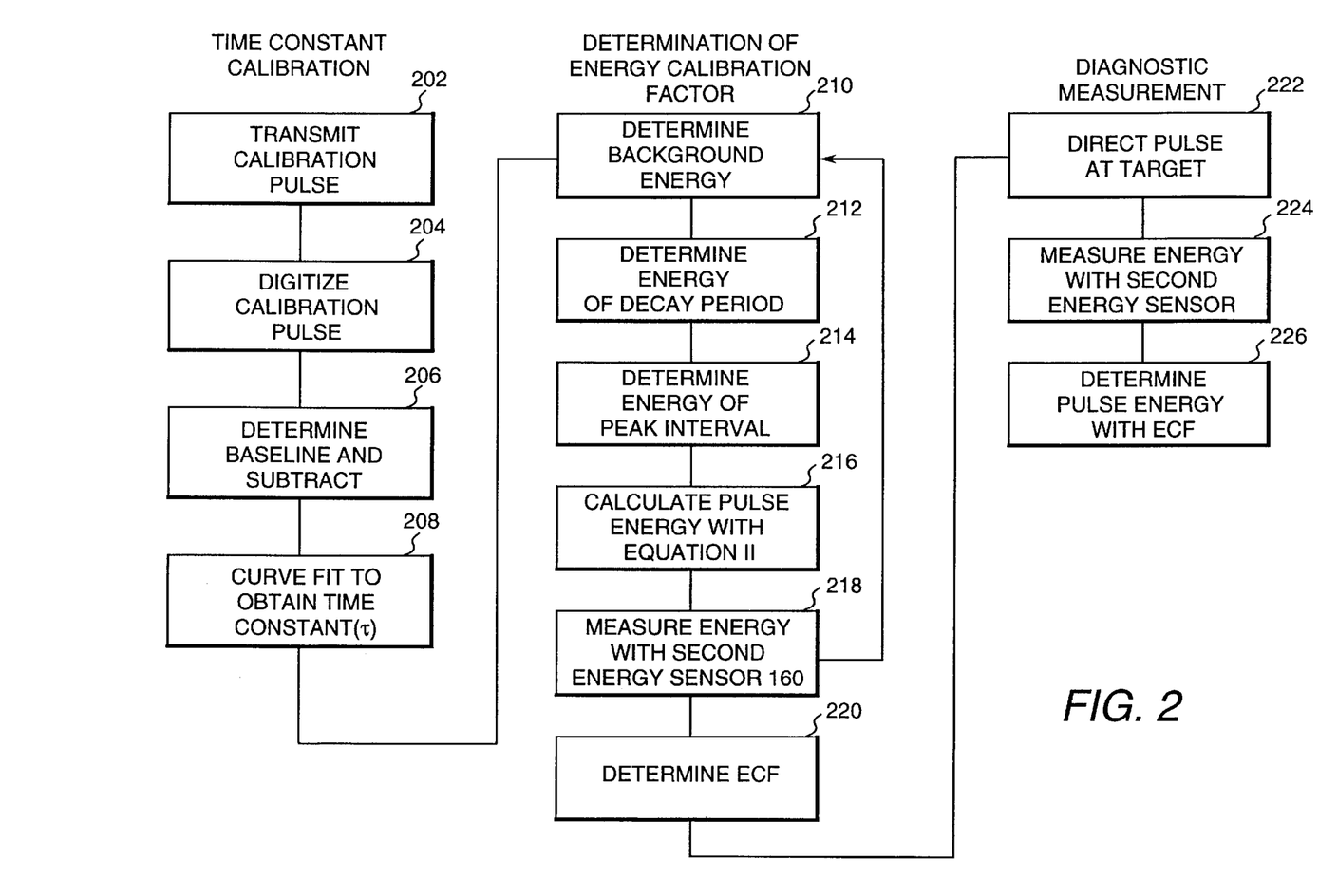
FIG. 2 is a flowchart illustrating a method for measuring a pulse energy according to an exemplary embodiment of the invention.
Figure 3A:
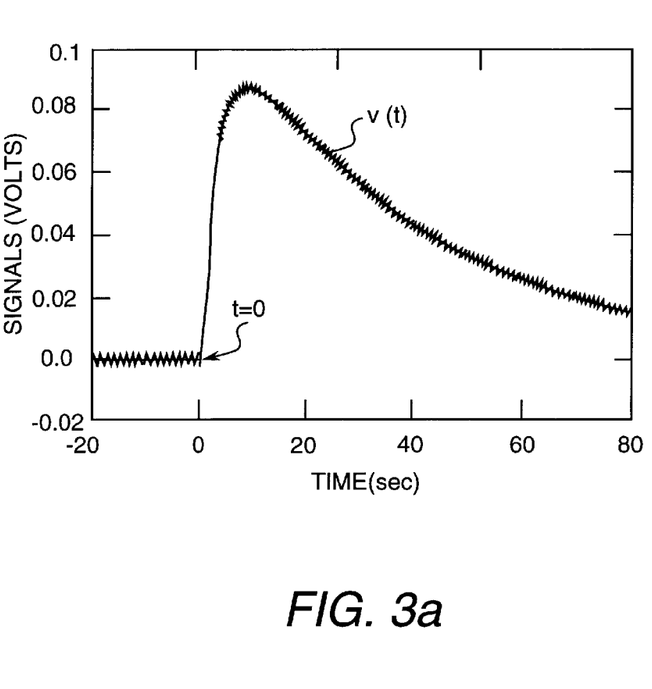
FIGS. 3a–3b are graphs of a signal output from the energy sensor 130 in FIG. 1 representing a calibration pulse.

The method, according to an exemplary embodiment, begins with a calibration in which the time constant and other parameters of the first energy sensor 130 are determined. As shown in FIG. 2 the first steps 202, 204 of the method comprise transmitting a calibration pulse with the laser 110 to the first energy sensor 130, and digitizing the calibration pulse with the digitizer 140. An example of a portion of the calibration pulse is shown in FIG. 3a.

Figure 3B:
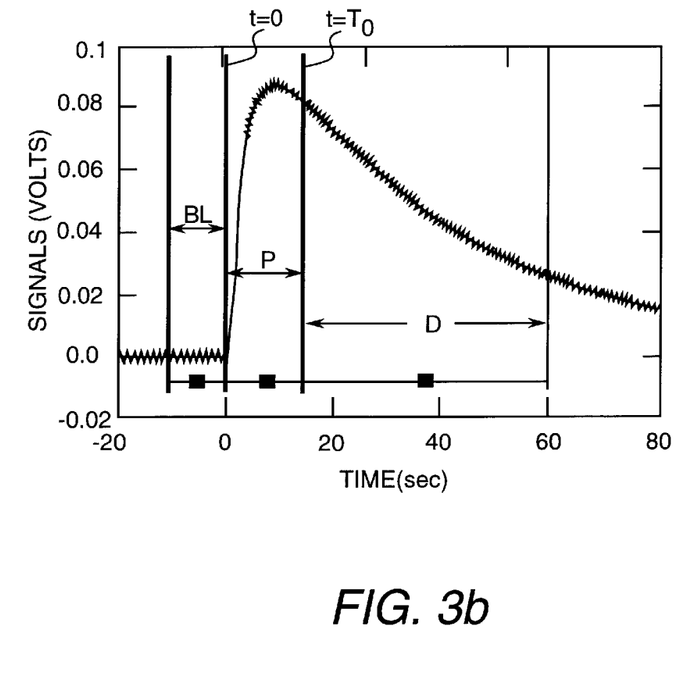

During calibration, the calibration pulse is transmitted when the first energy sensor 130 is in a state of thermal equilibrium. A baseline for the calibration pulse, which represents the output voltage signal of the first energy sensor 130 in thermal equilibrium, is then calculated in step 206. The baseline can be calculated by averaging the amplitudes of the points in the output voltage signal in a baseline interval of suitable duration, e.g. 5 seconds, just prior to the leading edge of the calibration pulse. FIG. 3b shows an example "BL" of the baseline interval. The calculated baseline is then automatically subtracted by the computer 150 from the calibration pulse and from subsequent pulses, and in the following discussion it is assumed that the data has no baseline.

After the baseline has been accounted for, the energy and other parameters of the calibration pulse can be determined. The time integral over the output voltage, $$\int_0^\infty V(t)\,dt,$$

represented graphically by the area under the curve V(t), is proportional to the energy absorbed by the first energy sensor 130. This integral can be obtained by summing all points in the digitized calibration pulse until the voltage signal V(t) decays to the noise level of the baseline. However, it typically takes several minutes for the output voltage signal to return to the baseline, which may be an undesirably long time in laser shock peening operations.

To expedite the measurement of pulse energy with the first energy sensor 130, the decay period of the output voltage signal, i.e. the period beginning at the onset of exponential decay and ending at the baseline, can be modeled mathematically with an exponential function defined with an amplitude $f_o$ and a single time constant $\tau$. By constructing an exponential model of the decay period of the output voltage signal, the need to measure and sum all the data points in the decay period, which may last several minutes, is eliminated. Rather, once the time constant $\tau$ is known, the energy in the decay period can be determined by measuring the amplitude $f_o$ of the output voltage signal, since the area under an exponential curve is equal to $f_o \cdot \tau$. A measurement of the amplitude can be accomplished accurately with a few data points covering a short time span.

Figure 4:
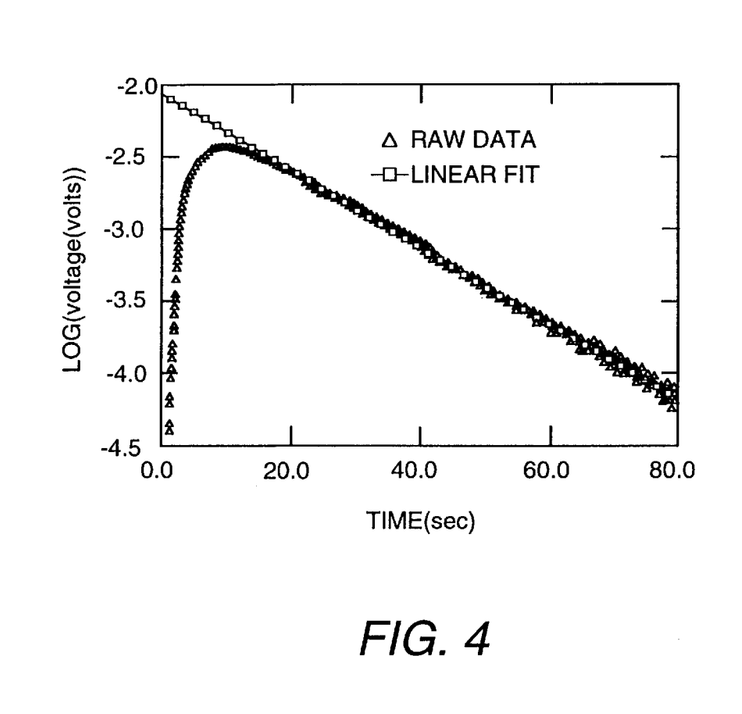
FIGS. 4–5 are graphs of the logarithm of a signal output from the energy sensor 130 of FIG. 1.
Figure 5:
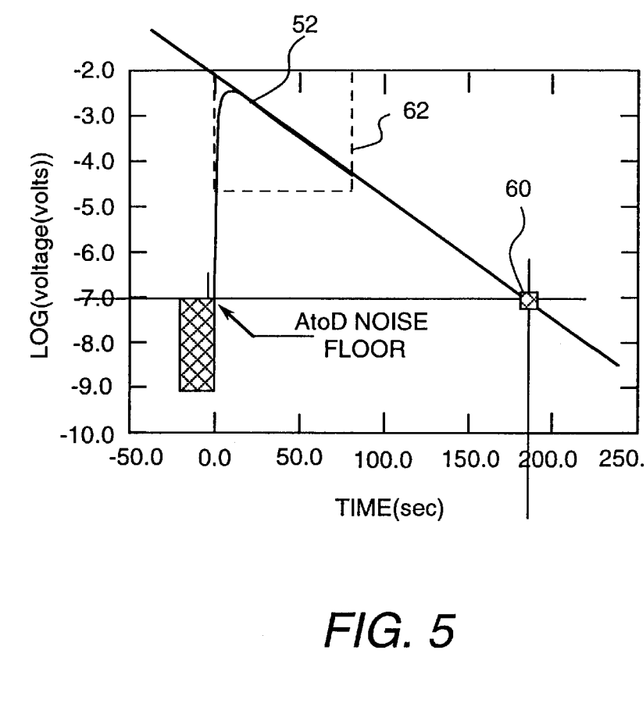

FIGS. 4 and 5 are graphs of the logarithm of the output voltage signal V(t) as a function of time, which show by their linearity that the trailing edge of the calibration pulse decays exponentially. FIG. 5 shows the total decay period of the calibration pulse from the onset of exponential decay at 52 to the point 60 at which the output voltage signal returns to the baseline. The portion of FIG. 5 outlined with the dashed line 62 is shown enlarged in FIG. 4.

The time constant for the decay period of the calibration pulse can be determined by fitting an exponential curve to all or a portion of the decay period. Because the decay period ending at the baseline can be several minutes long, the exponential curve is typically fit to a shorter "decay calibration interval", such as that defined by "D" in FIG. 3b, which is about 45 seconds long. The decay calibration interval D is preferably long enough to cover a significant change in the output voltage signal V(t) to achieve an accurate determination of the time constant $\tau$. Typically, a good fit can be obtained with a decay calibration interval D greater than or equal to the time constant $\tau$. The decay calibration interval should also be shorter than the entire decay period, because towards the end of the calibration pulse, noise in the output voltage signal V(t) becomes significant.

The time constant $\tau$ of the first energy sensor 130 is calculated, along with the amplitude $f_o$, by fitting the function $f(t) = f_o \cdot e^{-t/\tau}$ to the data in the decay calibration interval D, which calculation can be executed by the computer 150. In this fit, it is assumed that the function f(t) decays exponentially and, hence, that its logarithm is linear in time. To determine the time constant $\tau$ and the amplitude $f_o$, a least squares method is typically used, where $\chi^2$ defines the sum of the squares of the differences between the empirical data points V(t) and the function f(t). By defining the variables $A = \ln(f_o)$ and $B = 1/\tau$, the expression $\chi^2$ to be minimized is simplified to the following equation:

$$\chi^2 = \sum_i (A - B \cdot t_i - \ln V(t_i))^2 \tag{1}$$

$\chi^2$ can be minimized by taking its derivative with respect to A and B, which leads to the following two linear equations:

$$A \cdot N - B \cdot \sum_i t_i = \sum_i \ln V(t_i) \tag{2}$$

$$A \cdot \sum_i t_i - B \cdot \sum_i t_i^2 = \sum_i t_i \cdot \ln V(t_i) \tag{3}$$

which are solved for the unknowns A and B. The time constant $\tau$ and amplitude $f_o$ are then obtained in step 208 from $$\tau = \frac{1}{B} \text{ and } f_o = e^A. \tag{4}$$

$\tau$ and $f_o$ can then be used to calculate the energy in the decay period, which is equal to $f_o \cdot \tau$.

The total energy of the calibration pulse is the sum of the energy in the decay period and the energy in the peak interval ("P" in FIG. 3b) defined between the leading edge of the pulse and the beginning of the decay period. Since the peak interval P of the calibration pulse is typically much shorter than the decay period, the energy in the peak interval is typically determined by numerically integrating the data points in the digitized output voltage signal V(t). The total energy of the calibration pulse is thus obtained with the following equation:

$$E = \frac{\int_0^{T_o} V(t)dt + f_o \cdot \int_0^\infty e^{-\frac{t}{\tau}} dt}{S} = \frac{\int_0^{T_o} V(t)dt + f_o \cdot \tau}{S} \tag{5}$$

where $T_o$ is the duration of the peak interval P, and S is the sensitivity of the first energy sensor 130 in volts/watt which is typically provided by the manufacturer. Although the energy of the calibration pulse of FIG. 3a can be used as a data point in calculating the energy calibration factor, it is also possible to proceed directly to the determination of the energy calibration factor after calculating the time constant $\tau$ without calculating the energy of the calibration pulse.

After the time constant $\tau$ for the first energy sensor 130 has been calculated in step 208, the energy calibration factor ECF is determined by simultaneously measuring energy with the first and second energy sensors 130, 160. Typically, a series of laser pulses are generated, for example 20 pulses, and energy measurements are taken simultaneously at the first and second energy sensors 130, 160. The measured energy values are then averaged for each sensor, and the ratio of the two averaged values is calculated to determine the energy calibration factor ECF. According to another embodiment, the ECF is determined individually for each of a number of pulses, and then averaged. The ECF is subsequently used in laser shock peening, along with the energy measured by the second energy sensor 160, to determine the energy of the pulse incident on the target 125.

In measuring the energy of the decay period of a laser pulse, it is advantageous to reduce the time over which measurements are taken. Exemplary embodiments of the invention allow the energy of the decay period to be determined simply by measuring an amplitude of the output voltage signal V(t) at the beginning of the decay period. The amplitude is then multiplied by the time constant $\tau$ to obtain the energy of the decay period. The time constant is known and typically does not vary from pulse to pulse. The time constant is thus not recalculated in determining the ECF, according to one embodiment.

Figure 6:
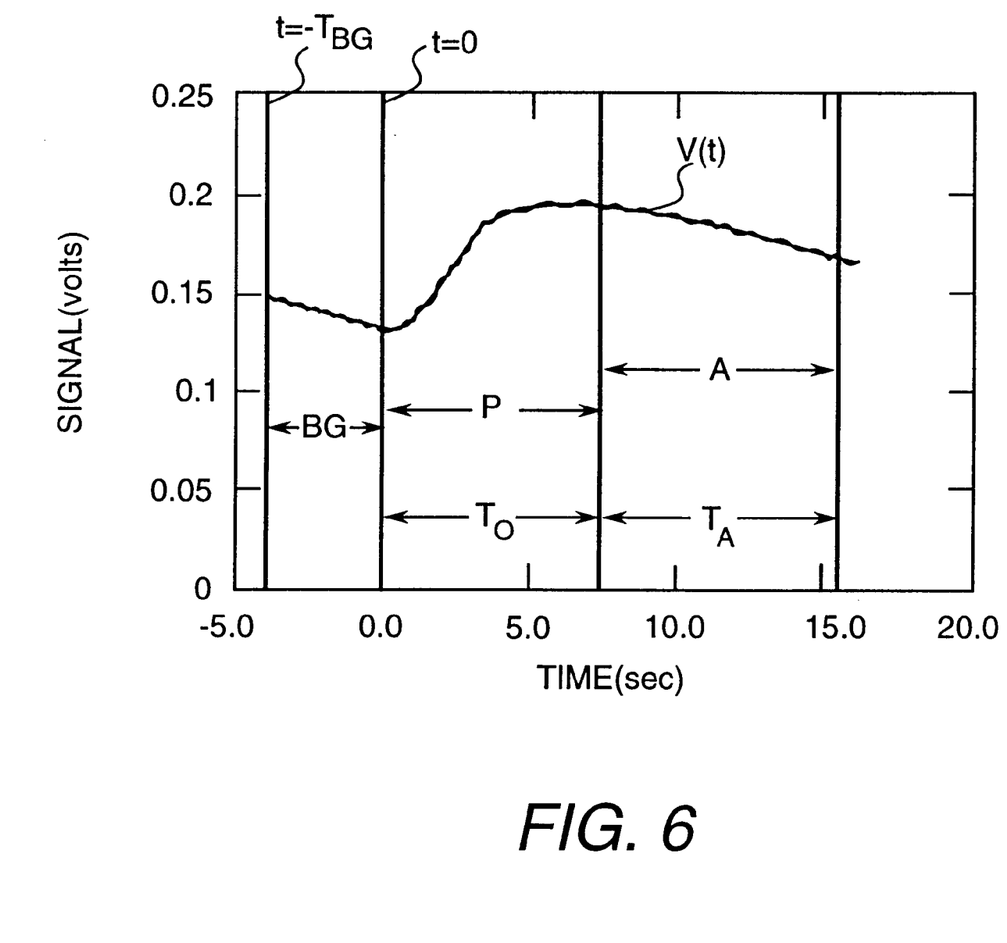
FIG. 6 is a graph of another signal output from the energy sensor 130 of FIG. 1 used to determine an energy calibration factor.

The amplitude can be measured by measuring a single point of the output voltage signal V(t). Alternatively, the amplitude may be measured in an amplitude interval "A", as shown in FIG. 6, in which the pulse is decaying exponentially. FIG. 6 also shows that the pulse can be generated before the output voltage signal V(t) decays to the baseline. Thus, a series of energy measurements can be made in an expedited manner to obtain an accurate determination of the energy calibration factor ECF.

When the pulse repetition rate is high enough that the first energy sensor 130 does not return to the baseline between pulses, a background energy from previous pulses exists which increases the output voltage signal V(t) over that of a pulse of equal energy generated from a zero baseline in thermal equilibrium. This is shown in FIG. 6, where at the beginning of the pulse at t=0 the output voltage signal is about 0.13 volts due to background energy from previous pulses. To account for background energy from previous pulses, the background energy can be mathematically modeled and removed. Although the background energy may result from a number of previous pulses, the sum of exponential functions with a common time constant can be mathematically represented by a single exponential function with the same time constant and an appropriate amplitude. Therefore, by calculating the amplitude $A_{BG}$ of the background signal at the start of a pulse, the background energy during that pulse can be calculated and subtracted from the energy measurement of that pulse. Thus, whatever the history of the first energy sensor 130 before a laser pulse, if the previous pulse has entered the exponential decay period, the cumulative background energy from previous pulses can be evaluated and removed.

The amplitude $A_{BG}$ of the exponentially decaying background energy of previous pulses is typically calculated over a background interval, illustrated in FIG. 6 as "BG". The following equation describes the relationship between the amplitude $A_{BG}$ of the exponential background energy function and the output voltage signal V(t) in the background interval:

$$A_{BG} \cdot \int_{-T_{BG}}^{0} e^{-\frac{t}{\tau}} dt = A_{BG} \cdot \tau \cdot \left(e^{\frac{T_{BG}}{\tau}} - 1\right) = \int_{-T_{BG}}^{0} V(t) dt \quad (6)$$

where $-T_{BG}$ represents the time at the beginning of the background interval. Since the time constant T is known, the amplitude $A_{BG}$ can be obtained by numerically evaluating the integral of the output voltage signal V(t) in the background interval and solving for $A_{BG}$. The amplitude $A_{BG}$ can also be obtained by simply measuring the output voltage signal V(t) at the beginning of the pulse at t=0. However, the method in which the background energy is numerically integrated over the background interval BG generally yields a more precise value of $A_{BG}$.

After solving for $A_{BG}$, the total background energy $E_{BG}$ under the pulse is obtained in step 210 by multiplying $A_{BG}$ by τ to obtain:

$$E_{BG} = A_{BG} \cdot \int_{0}^{\infty} e^{-\frac{t}{\tau}} dt = \int_{-T_{BG}}^{0} V(t) dt / (e^{T_{BG}/\tau} - 1) \quad (7)$$

In step 212, the energy in the decay period of the pulse is calculated by multiplying the amplitude $A_D$ at the beginning of the decay period by the time constant τ. The amplitude $A_D$ can be determined from a single data point of the output voltage signal V(t) at the beginning of the decay period. For improved accuracy, the amplitude $A_D$ can be obtained over an amplitude interval ("A" in FIG. 6) by numerically integrating the output voltage signal V(t). The amplitude interval A is typically shorter in duration than the decay calibration interval D shown in FIG. 3b which is used to calculate the time constant τ.

The following equation describes the relationship between the amplitude $A_D$ and the integral of the output voltage signal V(t) in the amplitude interval:

$$A_D \cdot \int_{0}^{T_A} e^{-\frac{t}{\tau}} dt = A_D \cdot \tau \cdot \left(1 - e^{-\frac{T_A}{\tau}}\right) = \int_{T_o}^{T_o+T_A} V(t) dt \quad (8)$$

where $T_o$ is the length of the peak interval and $T_A$ is the length of the amplitude interval. By solving the above equation for $A_D$ and multiplying $A_D$ by τ, the energy $E_D$ of the decay period of the pulse is obtained:

$$E_D = A_D \cdot \int_{0}^{\infty} e^{-\frac{t}{\tau}} dt = \frac{\int_{T_o}^{T_o+T_A} V(t) dt}{1 - e^{-\frac{T_A}{\tau}}} \quad (9)$$

In step 214, the energy $E_p$ of the peak interval ("P" in FIG. 6) of the pulse is obtained. Because the peak interval P is much shorter than the long trailing edge of the decay period, its contribution to the total energy integral is typically obtained by numerically integrating the output voltage signal V(t) in the peak interval as follows:

$$E_P = \int_{0}^{T_o} V(t) dt \quad (10)$$

In step 216, the total pulse energy is calculated. The total energy E of the pulse is the sum of the energies of the peak interval P and the decay interval D, minus the background energy, scaled by the sensitivity S:

$$E = \frac{E_P + E_D - E_{BG}}{S} \quad (11)$$

In step 218, an energy measurement is made with the second energy sensor 160. This measurement is made on the same pulse as that measured with the first energy sensor 130 in steps 212–216.

In step 220, the energy calibration factor ECF is determined. Typically, the energy calibration factor is obtained by calculating the ratio of the average energy measured by the first energy sensor 130 to the average energy measured by the second energy sensor 160 over a number of pulses. For example, steps 210–218 may be repeated for each of 20 pulses, and the averages of the energy measurements of the first and second energy sensors may be calculated. The ECF is then the average of the 20 energy measurements made by the first energy sensor 130 divided by the average of the 20 energy measurements made by the second energy sensor 160.

In calculating the ECF, the energy measurements can be made relatively quickly, since the pulse energy of each pulse can be measured long before the first energy sensor 130 has returned to thermal equilibrium. Also, the energy of the entire decay period can be determined relatively quickly simply by measuring the amplitude of the output voltage signal at the beginning of the decay period. As a consequence, the pulse repetition rate can be increased to the inverse of the combined lengths of the background interval, the peak interval, and the amplitude interval, which repetition rate is significantly higher than the inverse of the entire pulse duration shown in FIG. 5. The exemplary method thus allows an accurate determination of the energy calibration factor ECF to be made by averaging energy measurements over a series of pulses, while significantly expediting the measurement process.

In general, the peak interval P is preferably long enough to extend into the exponential decay period so that the amplitude interval A will begin as an exponential decay. Additional lengthening of the peak interval P beyond the beginning of the decay period may unnecessarily limit the repetition rate. The background interval BG and the amplitude interval A are preferably long enough to yield accurate results, but short enough to maintain a desirable repetition rate. For example, as shown in FIG. 6, the background interval BG can be about 4 seconds, and the amplitude interval A can be about 8 seconds.

After the energy calibration factor ECF has been determined through the energy measurements described above, the first energy sensor 130 is removed, and the laser pulses are directed against the laser shock peening target 125 in step 222. For each pulse directed against the target 125, the energy is measured with the second energy sensor 160 in step 224. The energy of each pulse can then be measured accurately in step 226 based on the product of the energy measured with the second energy sensor 160 and the energy calibration factor ECF.

To improve measurement accuracy, it is desirable to consistently redirect the same fraction of laser energy to the second energy sensor 160. Preferably, an optical wedge is used as the partial reflector 120. Typically, the optical wedge has a first face 122 which does not have an antireflection coating, and a second face 124 which does have an antireflection coating. The uncoated surface 122 provides a very predictable degree of reflectance for measurement, while the coated surface 124 reduces the amount of wasted energy reflected at the coated surface 124. The reflection off the uncoated surface 122 used for energy measurement is typically at a near perpendicular angle. The wedge typically comprises a material having a low index of refraction, which reduces the amount of energy reflected at the uncoated surface 122.

The term "optical wedge" simply refers to an optical element having a first face which is not parallel to a second face. Thus, a local region of a lens can be used as an optical wedge, wherein the front face of the lens is not parallel to the back face. Because the faces are not parallel, etalon effects or interferences, which are caused by plane parallel dielectrics, are avoided. The use of a surface 122 which is not antireflection coated also eliminates any variability caused by the coating, for example with humidity changes. Also, the selection of an angle of incidence (measured from the surface normal) which is nearly zero substantially eliminates polarization-dependent variations in signal amplitude, such as those which occur with 90° turning mirrors.

The method and apparatus according to the above described embodiments of the invention thus enable the laser shock peening process to be significantly improved by precise measurement of pulse energies and fine adjustment of the laser shock peening operating parameters which have a significant effect on the final product. The exemplary method and apparatus can be individually applied to a number of beams to individually measure and control each pulse incident on a laser shock peening target. Moreover, the exemplary method and apparatus provide improved accuracy in laser shock peening without unduly delaying peening operations. Although the invention has been described with reference to exemplary embodiments, those skilled in the art will recognize that modifications may be made without departing from the spirit and scope of the invention as defined in the following claims.

What is claimed is:

1. A method for measuring a pulse energy received by a target comprising the steps of:
   directing a first laser pulse to a first energy sensor which produces a first signal responsive to a power of the first laser pulse;
   determining a time constant of the first energy sensor based on the first signal;
   directing a second laser pulse to the first energy sensor which produces a second signal responsive to a power of the second laser pulse;
   redirecting a portion of the pulse energy of the second laser pulse to a second energy sensor which outputs a measurement of received laser energy;
   determining the pulse energy of the second laser pulse received by the first energy sensor based on the second signal and the time constant;
   measuring the redirected pulse energy of the second laser pulse with the second energy sensor;
   determining an energy calibration factor from a ratio of the determined pulse energy of the second laser pulse received by the first sensor to the measured redirected pulse energy of the second laser pulse;
   directing a third laser pulse at a target;
   redirecting a portion of the pulse energy of the third laser pulse to the second energy sensor;
   measuring the redirected pulse energy of the third laser pulse with the second energy sensor; and
   multiplying the measured redirected pulse energy of the third laser pulse by the energy calibration factor to obtain an energy of the third laser pulse received by the target.

2. The method of claim 1, wherein the first and second signals are voltage signals, and the first energy sensor comprises a calorimeter.

3. The method of claim 1, wherein the first signal includes a decay period which decays exponentially.

4. The method of claim 3, wherein the step of determining a time constant comprises fitting the decay period of the first signal to an exponential function.

5. The method of claim 4, wherein the step of fitting the decay period comprises minimizing a square of a difference between the decay period and the exponential function.

6. The method of claim 1, further comprising the steps of:
   determining a baseline value of the first energy sensor in thermal equilibrium; and
   subtracting the baseline value from the first signal.

7. The method of claim 1, further comprising the steps of:
   determining a background energy which exists in the first energy sensor during the second signal; and
   subtracting the background energy to determine the pulse energy of the second laser pulse.

8. The method of claim 7, wherein the step of determining a background energy comprises the steps of:
   measuring a background signal which precedes the second signal;
   determining an amplitude of an exponential function representing the background signal based on the measured background signal;
   estimating the background energy during the second signal with the exponential function, the amplitude, and the time constant.

9. The method of claim 8, wherein the step of determining an amplitude comprises numerically integrating the background signal over a background interval which precedes the second signal.

10. The method of claim 1, wherein the pulse energy of the second laser pulse is also based on an amplitude of the second signal at a beginning of a decay period of the second signal.

11. The method of claim 10, further comprising the step of numerically integrating the second signal over an interval in the decay period to determine the amplitude.

12. The method of claim 11, further comprising the steps of:
   directing a plurality of second laser beam pulses to the first energy sensor;
   redirecting a percentage of the pulse energies of each of the plurality of second laser beam pulses to the second energy sensor; and
   determining the energy calibration factor from the ratio of an average redirected pulse energy to an average pulse energy.

13. The method of claim 11, wherein the step of redirecting comprises reflecting the percentage of the pulse energy off a surface of an optical wedge.

14. The method of claim 13, further comprising the step of coating a second surface of the optical wedge with an antireflection coating.

15. An apparatus for measuring a pulse energy received by a target comprising:
- a first energy detector which receives a first portion of the energy of a laser beam and generates a signal responsive to a power of the first portion;
- a digitizer which digitizes the signal;
- a second energy detector which receives a second portion of the energy of the laser beam and outputs a measurement of the energy of the second portion;
- a partial reflector which redirects the second portion of the energy from the laser beam to the second energy detector; and
- a computer which:
  - calculates a time constant of the first energy detector based on a digitized signal of a first laser pulse incident on a first energy detector;
  - calculates an energy of a second laser pulse incident on the first energy detector based on a digitized signal of the second laser pulse and the time constant;
  - calculates an energy calibration factor based on a ratio of a first energy value calculated from the signal responsive to the power of the first portion received by the first energy detector and a second energy value corresponding to the measured energy of the second portion received by the second energy detector; and
  - calculates a pulse energy of a third laser pulse received by a target, wherein the target replaces the first energy sensor, and wherein the pulse energy received by the target is calculated by multiplying the energy calibration factor by an energy value measured by the second energy detector of a portion of the third laser pulse which is redirected to the second energy detector.

16. The apparatus of claim 15, wherein the first energy detector comprises a calorimeter.

17. The apparatus of claim 15, wherein the partial reflector comprises an optical wedge.

* * * * *